United States Patent
Thompson et al.

(10) Patent No.: US 10,690,581 B2
(45) Date of Patent: Jun. 23, 2020

(54) INFRARED THERMOGRAPHIC POROSITY QUANTIFICATION IN COMPOSITE STRUCTURES

(71) Applicant: The Boeing Company, Chicago, IL (US)

(72) Inventors: Jeffrey G. Thompson, Auburn, WA (US); Gary E. Georgeson, Tacoma, WA (US); Tyler M. Holmes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 871 days.

(21) Appl. No.: 14/961,419

(22) Filed: Dec. 7, 2015

(65) Prior Publication Data
US 2017/0160183 A1  Jun. 8, 2017

(51) Int. Cl.
*G01J 5/00* (2006.01)
*G01N 15/08* (2006.01)
*G01N 25/72* (2006.01)
*G01J 5/02* (2006.01)

(52) U.S. Cl.
CPC .............. *G01N 15/088* (2013.01); *G01J 5/02* (2013.01); *G01N 25/72* (2013.01); *G01N 2015/0846* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,374,122 A | * | 12/1994 | Devitt | G01N 15/088 374/153 |
| 7,018,094 B1 | * | 3/2006 | Bates | G01N 25/72 250/341.6 |
| 7,092,484 B1 | * | 8/2006 | Jensen | B22D 46/00 164/250.1 |

(Continued)

FOREIGN PATENT DOCUMENTS

| | | |
|---|---|---|
| EP | 1852697 A1 | 11/2007 |
| EP | 2570255 A1 | 3/2013 |

(Continued)

OTHER PUBLICATIONS

Examination Report for related British Application No. GB1620705.2; report dated Apr. 20, 2017.
Examination Report for related British Application No. GB1620705.2; report dated May 22, 2018.
Examination Report for related British Application No. GB1620705.2; report dated Mar. 23, 2018.

(Continued)

*Primary Examiner* — Lisa M Caputo
*Assistant Examiner* — Nasir U. Ahmed
(74) *Attorney, Agent, or Firm* — Miller, Matthias & Hull LLP

(57) ABSTRACT

An infrared (IR) thermography system for inspecting porosity of a test part of a given thickness is provided. The IR thermography system may include a thermal detector configured to detect IR signals emitted from the test part, and a controller in electrical communication with at least the thermal detector. The controller may be configured to at least determine thermal test data associated with the test part based on the IR signals, generate thermal model data based on the thickness of the test part, and determine porosity of the test part based on a comparison between the thermal test data and the thermal model data.

20 Claims, 3 Drawing Sheets

(56) References Cited

U.S. PATENT DOCUMENTS

| | | | | |
|---|---|---|---|---|
| 8,506,159 B2* | 8/2013 | Nakagawa | ............. | G01N 25/72 374/5 |
| 2005/0027499 A1* | 2/2005 | Bourbiaux | ............. | G01V 11/00 703/10 |
| 2012/0050537 A1* | 3/2012 | Ringermacher | ... | G01B 11/0658 348/164 |
| 2013/0035921 A1* | 2/2013 | Rodriguez-Ponce | ........................ | A61B 5/015 703/11 |
| 2014/0072197 A1* | 3/2014 | Ferguson | ............. | G01N 15/088 382/131 |
| 2014/0153608 A1* | 6/2014 | Zeng | .................... | G01B 21/085 374/5 |

FOREIGN PATENT DOCUMENTS

| | | |
|---|---|---|
| EP | 2706345 A2 | 3/2014 |
| WO | 2014/193601 A1 | 12/2014 |

OTHER PUBLICATIONS

Mayr, et al., "Active thermography as a quantitative method for non-destructive evaluation of porous carbon fiber reinforced polymers", NDT & E International, Elsevier, published [online] Jun 12, 2011 Accessed Mar 16, 2018. Available from: https://www.sciencedirect.com/science/article/pii/S0963869511000739.

Examination report for related GB Application No. 1620705.2; dated Sep. 20, 2019.

Shephard, "Flash thermography o f aerospace composites", IV Conferencia Panamericana de END Buenos Aires—Oct. 2007. Published [online] by NDT.net. Open access archive: https://ndt.net/article/panndt2007/papers/132.pdf.

Shepard et al., "Automated processing o f thermographic derivatives for quality assurance", Optical Engineering, vol. 46(5), 051008. Published by SPIE, May 2007. Downloaded From: http://opticalengineering.spiedigitallibrary.org/ on Apr. 26, 2013 Terms of Use: http://spiedl.org/terms.

Examination report for related GB Application No. 1620705.2; dated Sep. 14, 2018.

* cited by examiner

INFRARED THERMOGRAPHIC POROSITY QUANTIFICATION IN COMPOSITE STRUCTURES

TECHNICAL FIELD

The present disclosure relates generally to structural analyses of composite structures, and more particularly, to apparatus, systems and methods for evaluating porosity of a composite structure.

BACKGROUND

Evaluations of the structural integrity of a composite is of great interest to various industries including the aerospace industry. While the structural integrity of a test part may be examined using different methods or techniques, one category of techniques assess structural viability based on porosity measurements. Moreover, among the available means for measuring porosity, ultrasonic inspection is widely favored and used for its ability to detect relatively low levels of porosity. However, ultrasonic inspection techniques still come with various drawbacks. In particular, ultrasonic porosity measurements can be time consuming, and require direct access to or contact with the test part. Ultrasonic inspection also requires couplants which not only contaminate certain test parts, but also adds additional costs and delays. Furthermore, ultrasonic signals are susceptible to attenuation from porous layers of structures or materials situated closer to the ultrasonic detector, and are thereby blind, or at least much less sensitive, to structures or materials situated behind or underneath detected porous structures or materials.

Accordingly, the present disclosure is directed at addressing one or more of the deficiencies and disadvantages set forth above. However, it should be appreciated that the solution of any particular problem is not a limitation on the scope of this disclosure or of the attached claims except to the extent express noted.

SUMMARY OF THE DISCLOSURE

In accordance with one aspect of the present disclosure, a method for inspecting porosity of a test part with a given thickness is provided. The method may include receiving infrared (IR) signals emitted from the test part; determining thermal test data associated with the test part based on the IR signals; generating thermal model data based on the thickness of the test part; and determining porosity of the test part based on a comparison between the thermal test data and the thermal model data.

In accordance with another aspect of the present disclosure, an IR thermography system for inspecting porosity of a test part of a given thickness is provided. The IR thermography system may include a thermal detector configured to detect IR signals emitted from the test part, and a controller in electrical communication with at least the thermal detector. The controller may be configured to at least determine thermal test data associated with the test part based on the IR signals, generate thermal model data based on the thickness of the test part, and determine porosity of the test part based on a comparison between the thermal test data and the thermal model data.

In accordance with a further aspect of the present disclosure, a controller for inspecting porosity of a test part of a given thickness is provided. The controller may include a data analysis module, a reference module, a comparison module, and an assessment module. The data analysis module may be configured to determine thermal test data based on IR signals emitted from the test part. The reference module may be configured to generate thermal model data based on the thickness of the test part. The comparison module may be configured to determine deviations between the thermal test data and the thermal model data. The assessment module may be configured to determine porosity of the test part based on the deviations between the thermal test data and the thermal model data.

The features, functions and advantages that have been discussed can be achieved independently in various embodiments or may be combined in yet other embodiments, further details of which can be seen with reference to the following description and drawings.

DETAILED DESCRIPTION

Although the following sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection. It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent other than the language of the claims. To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
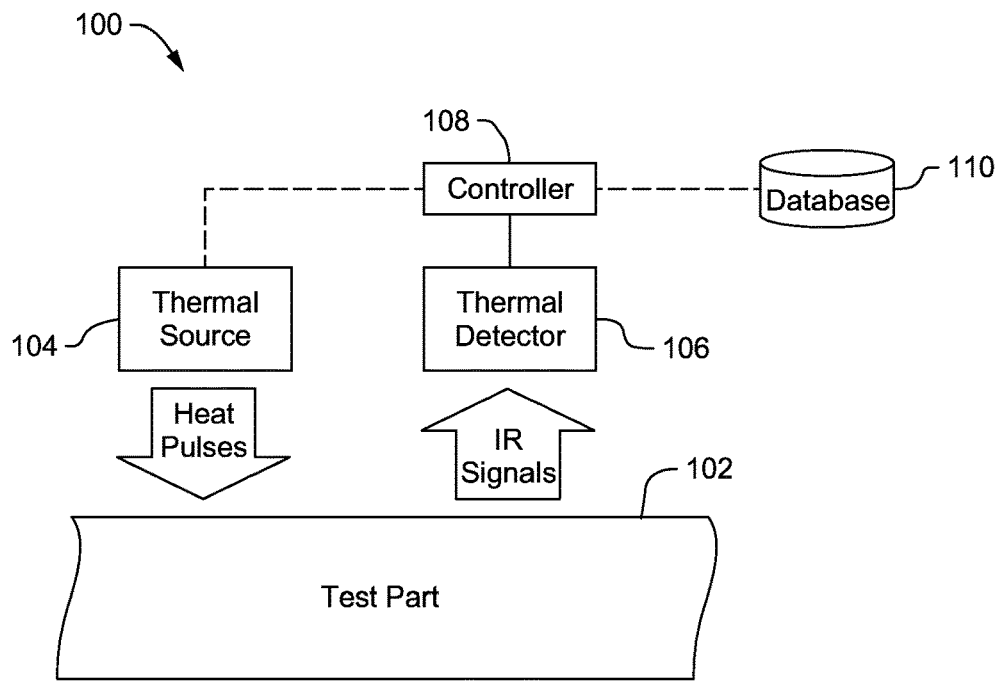
FIG. 1 is a diagrammatic view of one exemplary infrared (IR) thermography system provided in accordance with the teachings of the present disclosure.

Referring now to FIG. 1, one exemplary embodiment of an infrared (IR) thermography system 100 is schematically illustrated. The IR thermography system 100 shown may be used to evaluate the structural viability or integrity of a test part 102, such as a composite structure, or the like. More specifically, the system 100 may help analyze composite structures by inspecting and quantifying porosity of the test part 102 using IR signals, or radiation within the IR range of the electromagnetic spectrum. As illustrated in FIG. 1, the system 100 may employ one or more thermal sources 104 to emit heat pulses or other forms of radiation onto the test part 102 and cause a thermal variance within the test part 102. The system 100 may also employ one or more thermal detectors 106 to receive IR signals or radiation emitted from the test part 102 in response to the heat pulses introduced thereto. Furthermore, the system 100 may include a controller 108 which generally compares the data obtained and/or derived from the test part 102 to reference data of a known model part that is substantially the same as the test part 102, in order to determine the porosity and structural viability of the test part 102. Moreover, the controller 108 may derive such reference data per application and/or optionally retrieve reference information from a database 110 associated therewith.

Still referring to FIG. 1, the thermal source 104 may include heat lamps, flash lamps, or any other suitable source of radiation suited to emit one or more controlled heat pulses onto the test part 102, and at least partially and temporarily alter the temperature of the test part 102. The thermal detector 106 may include thermographic cameras, or any other suitable device configured to detect IR signals, or radiation within the IR range of the electromagnetic spectrum, emitted from the test part 102, and generate visual images or other forms of recognizable data corresponding to the received IR signals. For example, an IR camera may be employed to examine the entire surface of the test part 102, and capture changes in temperature relative to time for every pixel location within the corresponding field of view. The controller 108 may be in electrical communication with at least the thermal detector 106, and configured to manage operations of the thermal detector 106 as well as analyze data obtained by the thermal detector 106. Optionally, the controller 108 may also be in electrical communication with the thermal source 104 and configured to control the heat pulses emitted therefrom. Furthermore, the controller 108 may additionally be in electrical communication with a database 110 and configured to retrieve any reference data or information therefrom.

In addition, although a single controller 108 is shown in FIG. 1, the IR thermography system 100 may employ any one of a variety of different arrangements of controllers 108. For instance, the thermal source 104 may be independently controlled by one or more dedicated controllers 108 configured to manage and control the heat pulse emissions, as well as the timing, magnitudes, and/or sequences thereof. Correspondingly, the thermal detector 106 may also be independently controlled by one or more of its own dedicated controllers 108 configured to manage and control the manner by which IR signals are detected as well as process any of the data acquired. Alternatively, one or more centralized controllers 108 may be programmed and configured to manage operations of the overall system 100, including operations of both of the thermal source 104 and the thermal detector 106. Furthermore, while the controller 108 may be directly integrated into one or more of the thermal source 104 and the thermal detector 106, the controller 108 may alternatively be separately or centrally disposed relative to the thermal source 104 and the thermal detector 106, and implemented using any one or more of a processor, a microprocessor, a microcontroller, a field programmable gate array (FPGA), a programmable read-only memory (PROM), or any other device that can be operated in accordance with preprogrammed instructions and/or algorithms disclosed herein.

Figure 2:
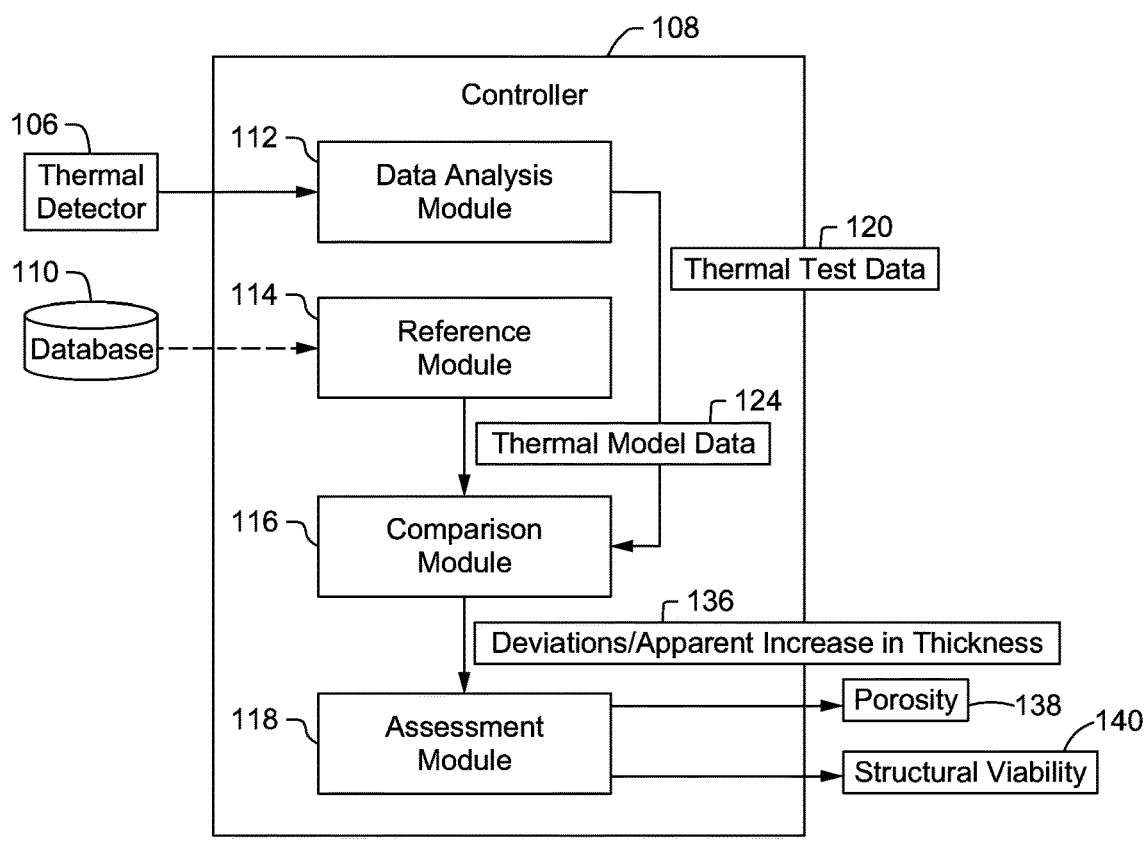
FIG. 2 is a diagrammatic view of one exemplary controller that may be used with an IR thermography system.

Turning to FIG. 2, one exemplary embodiment of a controller 108 that may be used in conjunction with the IR thermography system 100 is provided. As shown, for example, the controller 108 may be preprogrammed according to one or more algorithms generally categorized into a data analysis module 112, a reference module 114, a comparison module 116, an assessment module 118, or any other suitable arrangement of algorithms or code. The data analysis module 112 may be configured to receive information corresponding to IR signals that are emitted from the test part 102 and received by the thermal detector 106, and determine thermal test data 120 based on the IR signals. For instance, a thermal detector 106 which employs a thermographic camera may provide the data analysis module 112 with IR or related information in the form of thermal images generated using the IR radiation received from the test part 102. Based on the thermal images, the data analysis module 112 may determine thermal test data 120 generally including at least temperature data and diffusion times. More particularly, the thermal test data 120 may include information describing decreases in temperature with respect to time, or derivatives thereof, for a particular region of interest of the test part 102 as heat diffuses from the test part 102.

Figure 3:
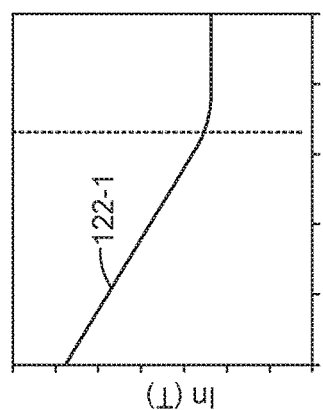
FIG. 3 is a graphical view of one IR curve depicting thermal test data in terms of temperature and diffusion time.
Figure 4:
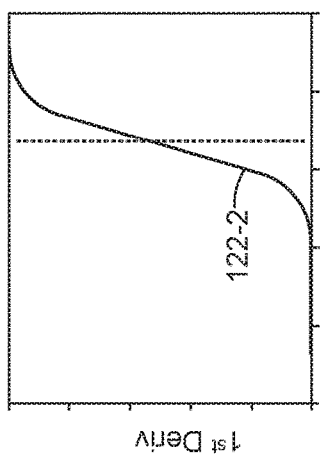
FIG. 4 is a graphical view of another IR curve depicting thermal test data in terms of a first derivative of temperature and diffusion time.
Figure 5:
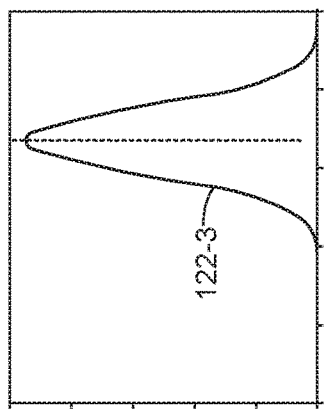
FIG. 5 is a graphical view of yet another IR curve depicting thermal test data in terms of a second derivative of temperature and diffusion time.

As shown in FIGS. 3-5, the data analysis module 112 may be configured to determine and/or identify thermal test data 120 received from the thermal detector 106 in any number of different forms. In FIG. 3 for example, the data analysis module 112 may receive thermal test data 120 provided or generated by the thermal detector 106 in the form of an IR curve 122-1 depicting temperature, or the natural logarithm thereof, as a function of time, or the logarithm thereof. The data analysis module 112 may further determine and/or identify derivatives of the IR curve 122-1 of FIG. 3. For instance, the IR curve 122-2 in FIG. 4 may represent a first derivative of the IR curve 122-1 of FIG. 3, while the IR curve 122-3 in FIG. 5 may represent a second derivative of the IR curve 122-1 of FIG. 3. Based on the temperature data and diffusion times contained within the IR curves 122, such as those shown in FIGS. 3-5, the data analysis module 112 may perform further assessments in order to quantify the porosity of the test part 102 at the given region of interest. For example, diffusion times, or the time it takes for heat to travel through the test part 102, may be used to determine a perceived thickness of the test part 102, which in turn, may be used to derive the porosity of the test part 102. More particularly, the presence of porosities within the test part 102 may hinder or slow the rate of transfer of heat, and thereby exhibit longer diffusion times or a perceived thickness that is greater than the actual thickness. Comparing the perceived thickness relative to the actual thickness and associated reference porosities may provide useful information for quantifying the porosity of the test part 102.

Figure 6:
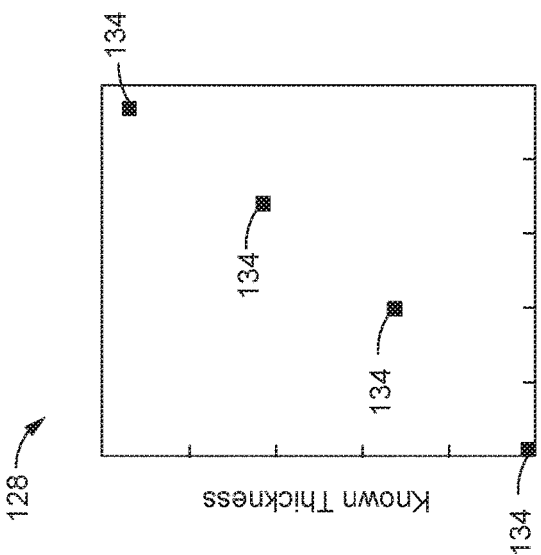
FIG. 6 is a pictorial view of porosity standards depicted in terms of an array of coupons of a model part.
Figure 7:
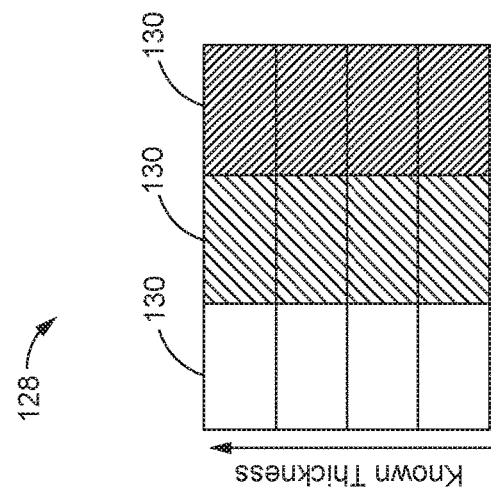
FIG. 7 is a graphical view of porosity standards depicted in terms of known thicknesses and known porosities.
Figure 8:
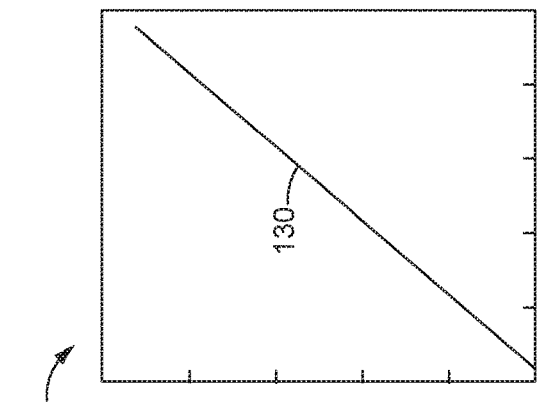
FIG. 8 is a graphical view of thermal model data depicted in terms of perceived thicknesses and reference porosities.

The reference module 114 of FIG. 2 may be configured to generate, or at least partially retrieve from a database 110, thermal model data 124 to be used for such comparisons. As shown in FIGS. 6-8, thermal model data 124 may include one or more reference porosities 126 which may be derived from one or more predefined porosity standards 128. While porosity standards 128 may be determined using any number of different techniques, one such technique may employ an array of coupons 130, or samples of a model part, where each coupon 130 has substantially the same characteristics and/or composition as the test part 102 but with controlled porosities and thicknesses. Moreover, each coupon 130 within the array may be formed to have a different predefined thickness and induced to have a different predefined porosity. Furthermore, performing IR thermography on the array of coupons 130 may provide thermographic data 132, as shown for example in FIG. 7, that is representative of the porosity standard 128 and interrelates the different part thicknesses to the different known or induced porosities. Additional analyses or interpolation of the thermographic data 132 may generate a baseline curve 134 as shown in FIG. 8 that is representative of the reference porosity 126, or the reference by which to gauge the porosity of the test part 102. As shown, increases in the porosity may exhibit increases in the thermographically measured thickness, or the perceived thickness, which may be measured in terms of the number of plies, or any other suitable unit of measurement. As expected, more porous specimens further reduce heat transfer rates or prolong diffusion times per ply or per unit of thickness, and are thereby thermographically perceived to have larger thicknesses.

Still referring to FIG. 2, the comparison module 116 in conjunction with the assessment module 118 may be configured to compare the thermal test data 120 determined by the data analysis module 112 with the thermal model data 124 provided by the reference module 114, and determine deviations between the thermal test data 120 and the thermal model data 124. For example, the comparison module 116 may compare the perceived thickness of the test part 102 as determined by the data analysis module 112 to the known actual thickness of the test part 102 to determine the deviation 136 or apparent increase in thickness of the test part 102. The assessment module 118 may be configured to determine porosity 138 of the test part 102 based on the deviations 136 between the thermal test data 120 and the thermal model data 124. For example, the assessment module 118 may be able to quantify the porosity 138 of the test part 102 based on the apparent increase in thickness determined by the comparison module 116. Among other forms of thermal model data 124 provided by the reference module 114, one or more relationships may relate different perceived thicknesses to different reference porosities 126 as shown by the baseline curve 134 in FIG. 8. The assessment module 118 may cross-reference the perceived thickness of the test part 102 derived from the data analysis module 112 to the baseline curve 134 to determine the corresponding porosity 138. The assessment module 118 may also determine or assess structural viability 140 of the test part 102 based on the porosity 138 and one or more predefined thresholds.

Figure 9:
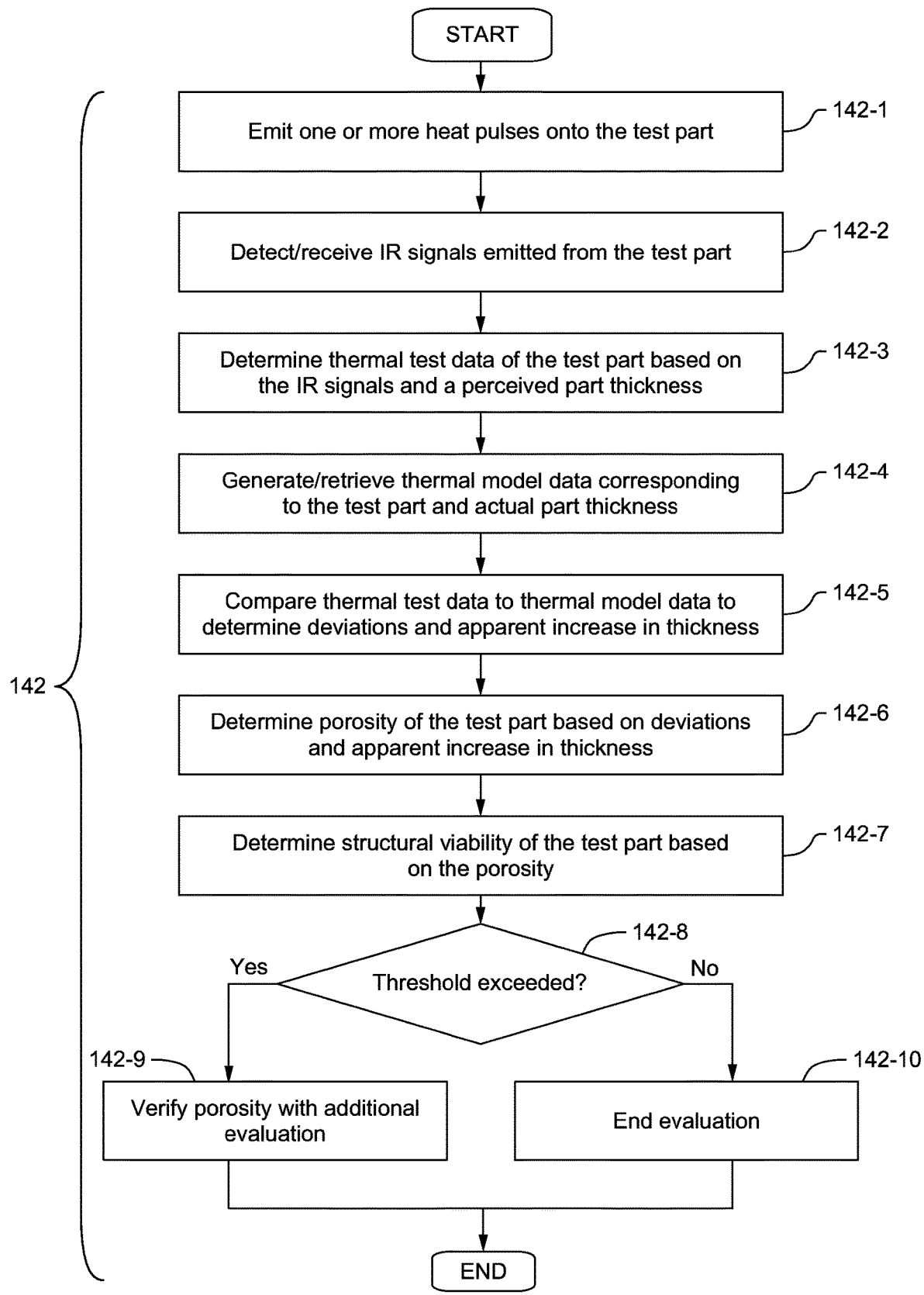
FIG. 9 is a diagrammatic view of one exemplary method for inspecting porosity using IR thermography of the present disclosure.

Turning now to FIG. 9, one exemplary algorithm or method 142 for inspecting the porosity of a test part 102 is provided. As shown in block 142-1, a thermal source 104 may be used to initially emit one or more heat pulses onto the test part 102. The method 142 in block 142-2 may then employ a thermal detector 106 to detect or receive IR signals that are emitted from the test part 102 in response to the heat pulses that were introduced to the test part 102 in block 142-1. In block 142-3, the method 142 may be used to determine and/or identify thermal test data 120, such as changes in temperature of the test part 102 as well as diffusion times, or the time it takes for the heat to travel through a given thickness of the test part 102 at the region of interest. Moreover, the thermal test data 120 may include one or more IR curves 122 that may be indicative of a perceived thickness of the test part 102. According to block 142-4, the method 142 may further generate and/or retrieve thermal model data 124 corresponding to the test part 102. For example, the thermal model data 124 may include one or more baseline curves 134 indicative of reference porosities 126 for a model part having substantially the same characteristics, composition, dimensions and/or thickness as the test part 102.

Still referring to FIG. 9, the method 142 in block 142-5 may additionally compare the thermal test data 120 to the thermal model data 124 to check for deviations 136 therebetween, such as an apparent increase in the perceived thickness relative to the actual thickness of the test part 102. Furthermore, based on the perceived thickness of the test part 102 and the reference porosities 126, such as those provided by the baseline curve 134 in FIG. 8, the method 142 in block 142-6 may be able to determine or quantify the porosity 138 of the test part 102. Additionally or optionally, the method 142 in block 142-7 may continue to determine the structural viability 140 of the test part 102 based on the porosity 138. For example, the method 142 may compare the porosity of the test part 102 to predefined thresholds, such as in block 142-8, to determine whether the porosity 138 falls within predetermined limits for the given composite test part 102 and corresponds to acceptable levels of structural viability 140. If the porosity 138 exceeds acceptable thresholds, the method 142 in block 142-9 may perform additional or other evaluations to further verify the porosity of the test part 102. If, however, the porosity 138 does not exceed any thresholds, the method 142 in block 132-10 may deem the structural viability 140 of the test part 102 as acceptable and end the evaluation.

It will be appreciated that the foregoing description provides examples of the disclosed apparatus, systems and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for inspecting porosity of a test part with a given thickness, comprising:
   emitting, by a thermal source, one or more heat pulses onto the test part;
   detecting, by a thermal detector, IR signals emitted from the test part;
   determining thermal test data associated with the test part based on the IR signals, wherein the thermal test data includes diffusion times of the test part;
   deriving, from the thermal test data, one or more IR curves indicative of a perceived thickness of the test part;

determining a relative thickness of the test part based on a difference between the given thickness and the perceived thickness;

generating thermal model data based on a thickness of a model part, wherein the model part has substantially the same thickness as the test part;

generating, from the thermal model data, one or more baseline curves indicative a reference porosity of the model part; and deriving porosity of the test part based on the reference porosity of the model part and the relative thickness of the test part.

2. The method of claim 1, wherein the thermal test data includes at least temperature data and diffusion times derived from the IR signals.

3. The method of claim 1, wherein the reference porosities are retrieved from one or more porosity standards which interrelate different known porosities for different controlled thicknesses of the model part.

4. The method of claim 1, further comprising:
determining structural viability of the test part based on the porosity.

5. The method of claim 4, wherein determining structural viability of the test part comprises determining whether the porosity of the test part falls within predetermined limits.

6. The method of claim 5, further comprising, when the porosity exceeds the predetermined limits, verifying the porosity of the test part.

7. The method of claim 1, in which the one or more IR curves depict a natural logarithm of temperature.

8. The method of claim 1, in which the one or more IR curves depict temperature.

9. The method of claim 8, in which the one or more IR curves depict a first derivative of temperature.

10. The method of claim 8, in which the one or more IR curves depict a second derivative of temperature.

11. A system for inspecting porosity of a test part of a given thickness, comprising:
at least one thermal source configured to emit one or more heat pulses onto the test part;
a thermal detector configured to detect infrared (IR) signals emitted from the test part; and
a controller in electrical communication with the at least one thermal source and the thermal detector, the controller being configured to at least:
determine thermal test data associated with the test part based on the IR signals, wherein the thermal test data includes diffusion times of the test part;
derive, from the thermal test data, one or more IR curves indicative of a perceived thickness of the test part;
determine a relative thickness of the test part based on deviations between the perceived thickness and the given thickness of the test part;
generate thermal model data based on a thickness of a model part, wherein the model part has substantially the same thickness as the test part;
generate, from the thermal model data, one or more baseline curves indicative of a reference porosity for the model part; and
derive a porosity of the test part based on the reference porosity of the model part and the relative thickness of the test part.

12. The system of claim 11, wherein the controller is configured to determine thermal test data including at least temperature data and diffusion times derived from the IR signals.

13. The system of claim 11, wherein the controller is configured to retrieve the reference porosities from one or more porosity standards which interrelate different known porosities with different controlled thicknesses of the model part.

14. The system of claim 11, wherein the controller is configured to determine structural viability of the test part based on the porosity.

15. The system of claim 14, wherein the controller is further configured to determine the structural viability of the test part by determining whether the porosity of the test part falls within predetermined limits.

16. A system for inspecting porosity of a test part of a given thickness, comprising:
at least one thermal source configured to emit one or more heat pulses onto the test part;
a thermal detector configured to detect infrared (IR) signals emitted from the test part; and
a controller in electrical communication with the at least one thermal source and the thermal detector, the controller including:
a data analysis module configured to receive the IR signals from the thermal detectors, determine thermal test data based on the IR signals emitted from the test part, and derive one or more IR curves indicative of a perceived thickness of the test part from the thermal test data;
a reference module configured to generate one or more baseline curves indicative of a reference porosity for a model part having substantially the same thickness as the test part;
a comparison module configured to determine a relative thickness of the test part based on deviations between the perceived thickness and the given thickness of the test part; and
an assessment module configured to determine porosity of the test part based on the reference porosity of the model part and the relative thickness of the test part.

17. The system of claim 16, wherein the data analysis module is configured to determine thermal test data including at least temperature data and diffusion times derived from the IR signals.

18. The system of claim 16, wherein the reference module is configured to retrieve the reference porosities from one or more porosity standards which interrelate different known porosities with different controlled thicknesses of the model part.

19. The system of claim 16, wherein the controller is configured to determine structural viability of the test part based on the porosity.

20. The system of claim 19, wherein the controller is further configured to determine the structural viability of the test part by determining whether the porosity of the test part falls within predetermined limits.

* * * * *